(12) United States Patent
Sugawara et al.

(10) Patent No.: US 7,787,795 B2
(45) Date of Patent: Aug. 31, 2010

(54) ANGLE ADJUSTMENT DEVICE AND IMAGE FORMING APPARATUS

(75) Inventors: Shun Sugawara, Hadano (JP); Mitsuhiro Kawai, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 510 days.

(21) Appl. No.: 11/846,214

(22) Filed: Aug. 28, 2007

(65) Prior Publication Data
US 2008/0062444 A1    Mar. 13, 2008

(30) Foreign Application Priority Data
Sep. 11, 2006    (JP) ............................. 2006-245703

(51) Int. Cl.
G03G 15/00    (2006.01)
(52) U.S. Cl. ...................................... 399/81
(58) Field of Classification Search ................. 399/81; 248/291.1, 292.11, 274.1, 276.1, 292.12, 248/917, 920, 922; 361/679.12, 679.19, 361/679.2, 679.57, 679.58
See application file for complete search history.

(56) References Cited

U.S. PATENT DOCUMENTS

| | | | | |
|---|---|---|---|---|
| 146,934 A | * | 1/1874 | Miller | 248/291.1 |
| 413,131 A | * | 10/1889 | Chappell | 248/291.1 |
| 436,717 A | * | 9/1890 | Moore | 248/292.12 |
| 1,995,656 A | * | 3/1935 | Stout | 248/292.12 |
| 4,519,648 A | * | 5/1985 | Jovanovic | 248/292.12 |
| 5,649,188 A | | 7/1997 | Nomura et al. | |
| 6,091,600 A | * | 7/2000 | Jeong | 361/679.12 |
| 6,324,810 B1 | * | 12/2001 | Thompson | 248/292.12 |
| 6,572,060 B2 | * | 6/2003 | Yoon | 248/292.12 |
| 6,795,662 B2 | * | 9/2004 | Kudo | 399/81 |
| 7,366,436 B2 | * | 4/2008 | Akiyama et al. | 399/81 |
| 7,497,408 B2 | * | 3/2009 | Lim et al. | 248/292.11 |

FOREIGN PATENT DOCUMENTS

| JP | 2004-198741 | 7/2004 |
|---|---|---|
| JP | 2006-259205 | 9/2006 |

OTHER PUBLICATIONS

U.S. Appl. No. 09/210,942, filed Dec. 15, 1998, Hirofumi Endo, et al.
U.S. Appl. No. 11/376,344, filed Mar. 16, 2006, Mitsuhiro Kawai, et al.

* cited by examiner

*Primary Examiner*—Susan S Lee
(74) *Attorney, Agent, or Firm*—Oblon, Spivak, McClelland, Maier & Neustadt, L.L.P.

(57) ABSTRACT

An angle adjustment device includes a main body, an operation panel supported for up-down rotation with respect to the main body, a block mechanism to block rotation of the operation panel with respect to the main body, a release-hold mechanism to release the rotation of the operation panel by the block mechanism and also to hold a released state, and a recovery mechanism to return from a state in which a blocked operation of the operation panel by means of the block mechanism is released to a state in which a rotation of the operation panel is blocked by means of the block mechanism.

14 Claims, 18 Drawing Sheets

ANGLE ADJUSTMENT DEVICE AND IMAGE FORMING APPARATUS

PRIORITY CLAIM

The present application is based on and claims priority from Japanese Application 2006-245703, filed Sep. 11, 2006, the disclosure of which is incorporated by reference herein in its entirety.

BACKGROUND OF THE INVENTION

1. Field of the Invention

The present invention relates to an angle adjustment device and an image forming apparatus, and more specifically, relates to support the angle adjustment device for an up-down rotation of an operation panel with respect to the main body and fix an up-down rotation angle of the operation panel with respect to the main body and further relates to the image forming apparatus having the angle adjustment device.

2. Description of Related Art

In recent years, an image forming apparatus such as copying machines and printer devices is equipped with an operation panel used by users to enter commands for executing jobs and display the image forming apparatus unit. Such an operation panel is generally fixed to a housing (on the main body) which contains components of the image forming apparatus. Fixing the operation panel may cause a light reflection depending on the positional relation between user view angle and room lighting device, undesirably degrading a visibility of the operation panel. To avoid such inconvenience, adjusting an angle of the operation panel to improve the visibility is enabled by an image forming apparatus having an angle adjustment device publicly known for example by JP-A-2004-198741.

However, it is assumed that a device disclosed in the above mentioned patent publication, after adjusting an angle of operation panel, keeps the angle for using the image forming apparatus. Thus, in case that such type of image forming apparatus is installed under a condition where it is used by any unspecified number of users, angle adjustment of operation panel may not be optimal for a specific user. Hereafter, assuming that an increase of peoples who use nursing-care tools such as wheel-chair, it is expected that operation panel visibility and operability when used from a low position is also required to assure. To answer this requirement, various types of angle adjustment device are being developed.

An example of such angle adjustment device is a device having a lock releasing button placed on both sides of the operation panel, the button being depressed with both hands so to change an angle of the operation panel while the button being held down. This type of angle adjustment device however needs both hands for lock releasing, thereby losing the operability for those who are using nursing-care tools. In addition, since the angle is adjusted while the button being depressed, a risk of pinching fingers makes this type of the device inconvenient.

SUMMARY OF THE INVENTION

The present invention is carried out under the above mentioned conditions and a first object thereof is to provide an angle adjustment device enabling a simple angle adjusting operation.

A second object of the present invention is to provide an image forming apparatus having an operation panel with an excellent visibility and operability.

To obtain a first object, an angle adjustment device according to one embodiment of the present invention includes a main body, an operation panel supported on the main body to be capable of moving between a use position and a storage position, that is to say, to enable up-down rotation, a block mechanism to block rotation of the operation panel with respect to the main body, a release hold mechanism to release block against rotation of the operation panel by the block mechanism and hold a released state, and a recovery mechanism, interacting with rotation of the operation panel, to restore by the block mechanism from a state where a blocked rotation of the operation panel is released to a state where rotation of the operation panel is blocked by the block mechanism.

To obtain a second object, an image forming apparatus according to one embodiment of the present invention includes an operation panel on which users enter a command, a main body to form an image based on a command entered from the operation panel, and an angle adjustment device according to adjust an up-down rotation angle of the operation panel with respect to the main body.

DETAILED DESCRIPTION OF THE PREFERRED EMBODIMENTS

Preferred embodiments of the present invention will be described in detail with reference to the accompanying drawings.

Figure 1:
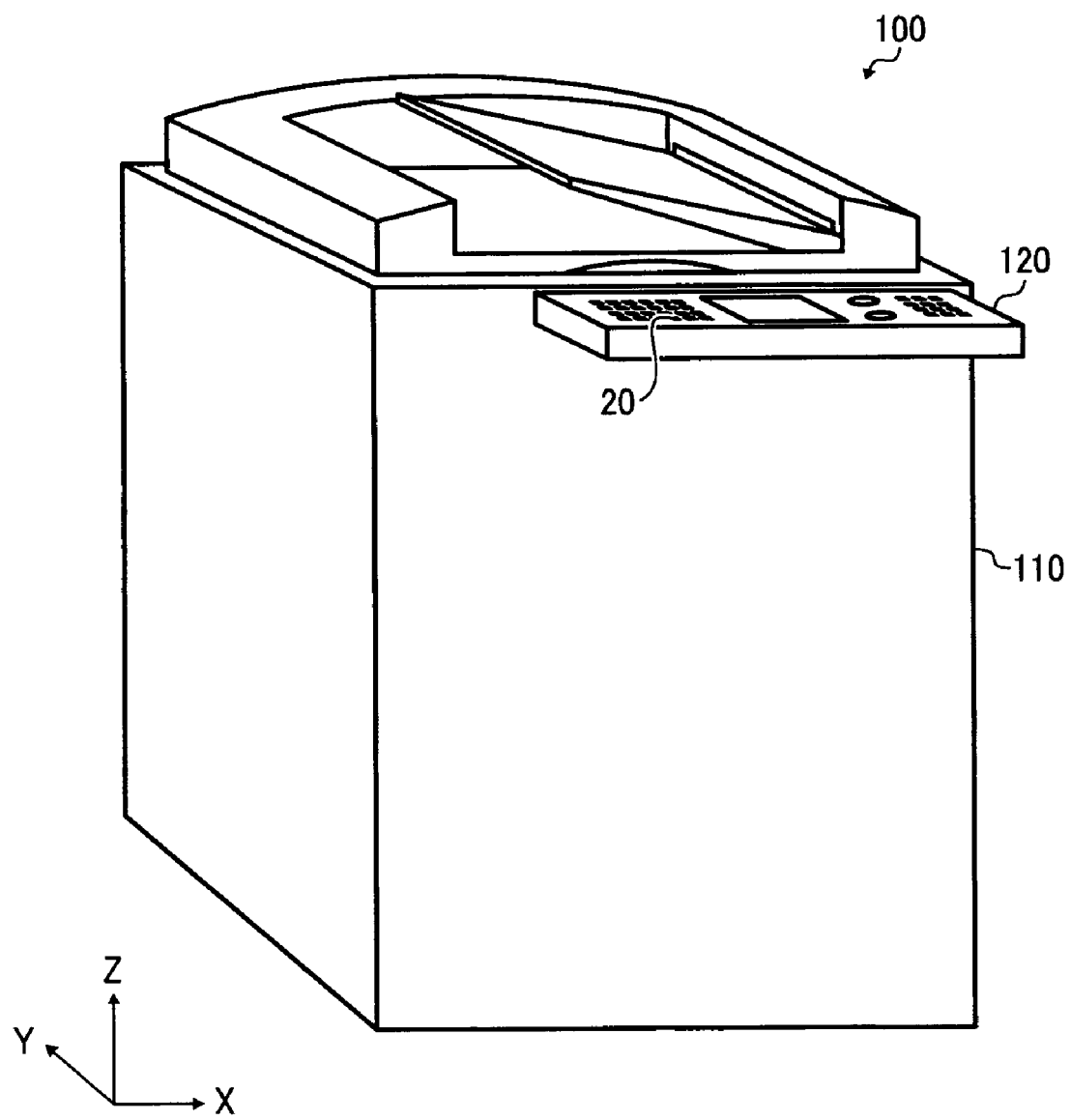
FIG. 1 is a schematic view of an image forming apparatus in accordance with an embodiment of the present invention.
Figure 2A:
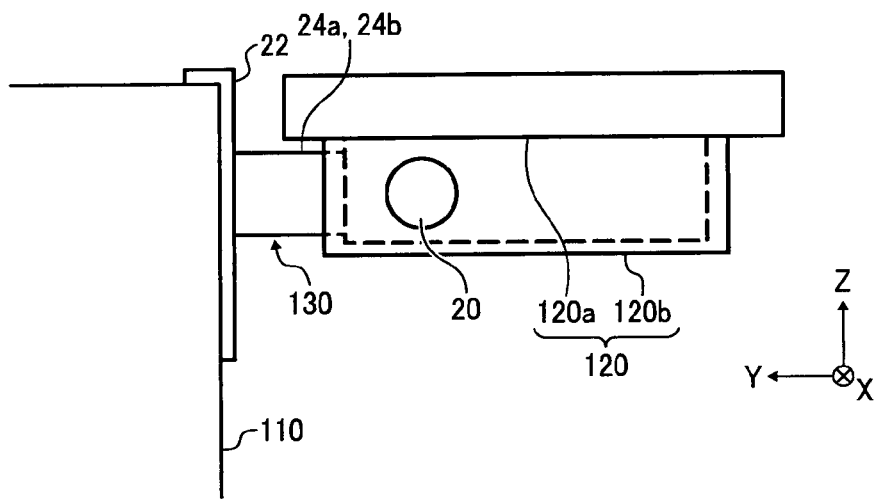
FIG. 2A shows a diagram of image forming apparatus condition, viewing the vicinity of operation panel from –X direction in accordance with an embodiment of the present invention, where an operation panel is supported generally horizontal to a main body.

FIG. 1 shows an external appearance of a copying machine 100, as an image forming apparatus according to one embodiment of the present invention. The copying machine 100 includes an operation panel 120 having an interface which enters a command by a user and a main body 110 which has a generally rectangular solid-like shape and is configured to read an image and to copy the read image on a paper, based on a command entered through the operation panel 120. The operation panel 120, as shown in FIG. 2A which indicates a vicinity of the operation panel 120 viewed from –X direction toward +X direction, has an operation panel main unit 120a and an operation panel cover 120b disposed to cover a part of a rear side of the operation panel main unit 120a. The operation panel 120 is supported on the main body 110, for example, to be capable of moving between a use position and a storage position, that is to say, to enable up-down rotation, The operation panel cover 120b, as shown in an exploded perspective view of FIG. 3 (diagram of the operation panel 120 viewed from rear side (–Z side)), includes a box-like member having an opening provided at +Z side, and also includes notches 26a,26b,26c and 26d which are formed along +Y side to –Z side surfaces thereof. A –X side surface of the operation panel cover 120b has an opening whose cross-section is circular (not shown) and a depressing button 20 is inserted in the circular opening. The depressing button 20 is disposed in a position allowing a user to access from outside.

Figure 2B:
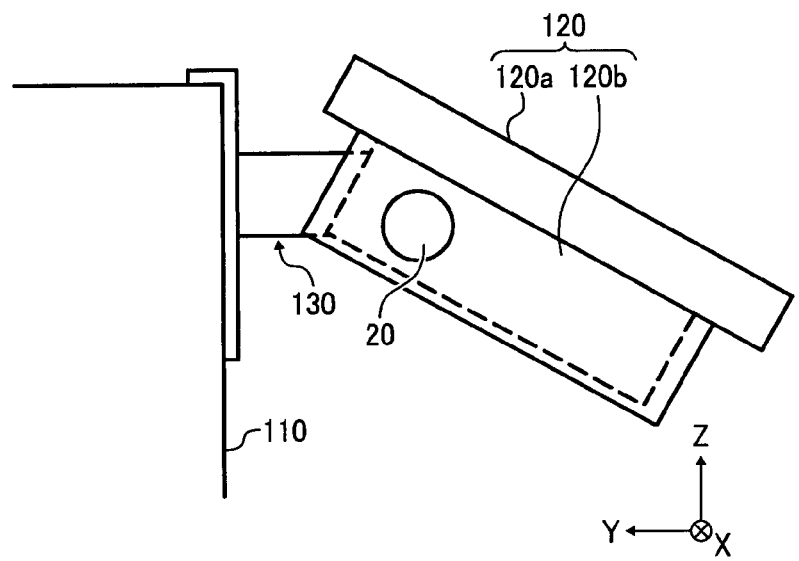
FIG. 2B shows a diagram of a copying machine indicating a condition viewing the vicinity of operation panel from –X direction in accordance with an embodiment of the present invention, where an operation panel is tilted with respect to the main body.
Figure 2C:
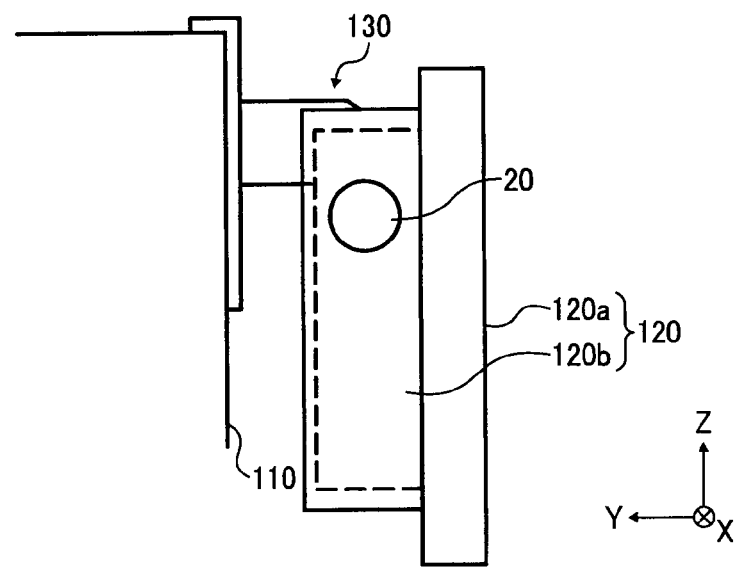
FIG. 2C shows a diagram of the copying machine indicating a condition viewing the vicinity of operation panel from –X direction in accordance with an embodiment of the present invention, where the operation panel is positioned generally orthogonally with respect to the main body.
Figure 3:
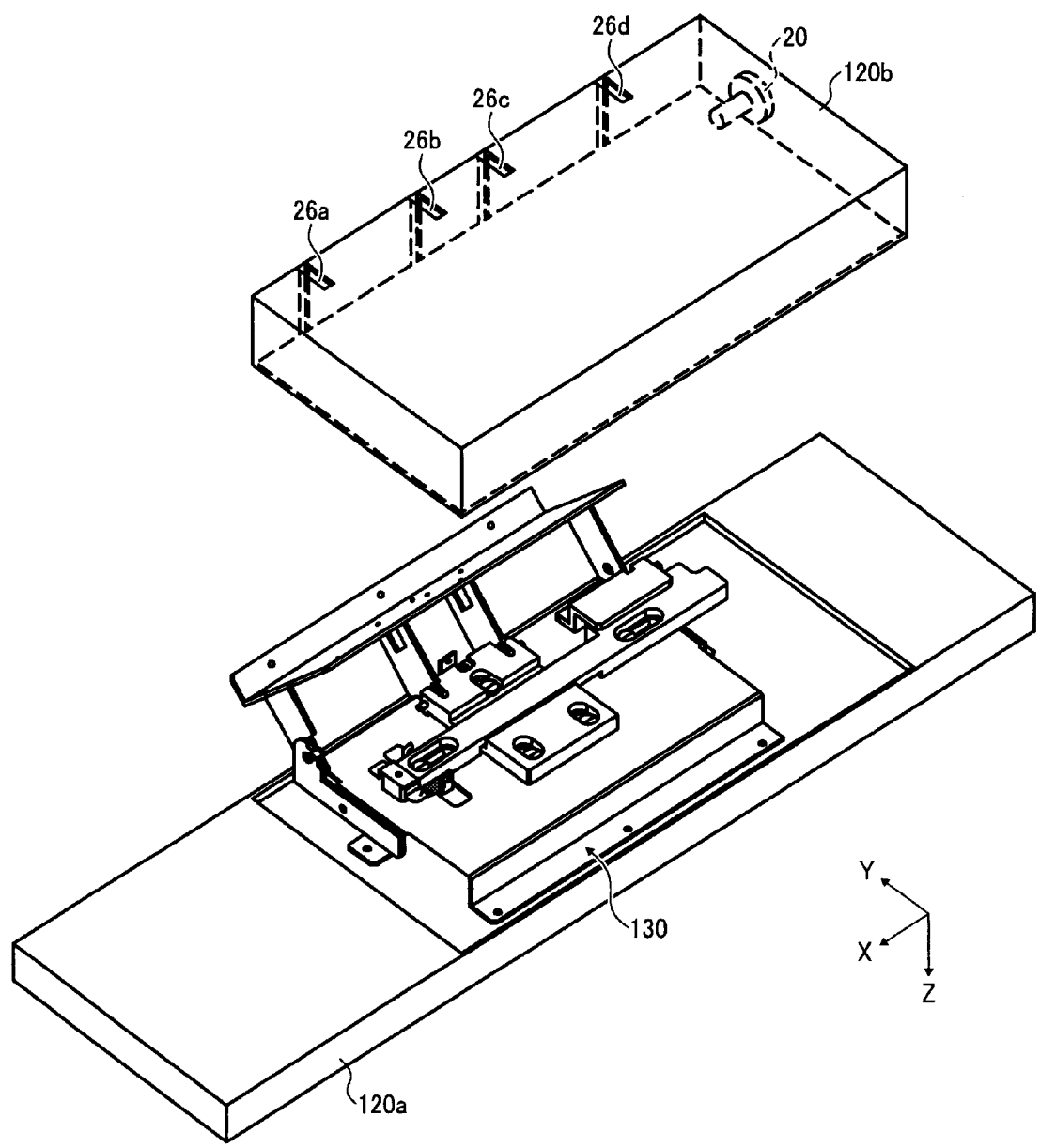
FIG. 3 shows an exploded perspective view of the copying machine in accordance with an embodiment of the present invention, where the operation panel is viewed from rear side.

In a space formed by the operation panel cover 120b and the operation panel main unit 120a, as shown in FIG. 3, a part of an angle adjustment device 130 is disposed. The operation panel 120 is, via an angle adjustment device 130, attached to the main body 110 (refer to FIG. 2A and others). The angle adjustment device 130 is supported, as shown in FIG. 2A to FIG. 2C, to the main body 110 so that the operation panel 120 can take an angle adjustment of three steps every predetermined angles.

Hereinafter, a structure of the angle adjustment device 130 is described in detail with reference to mainly FIG. 4 and other drawings as necessary.

Figure 4:
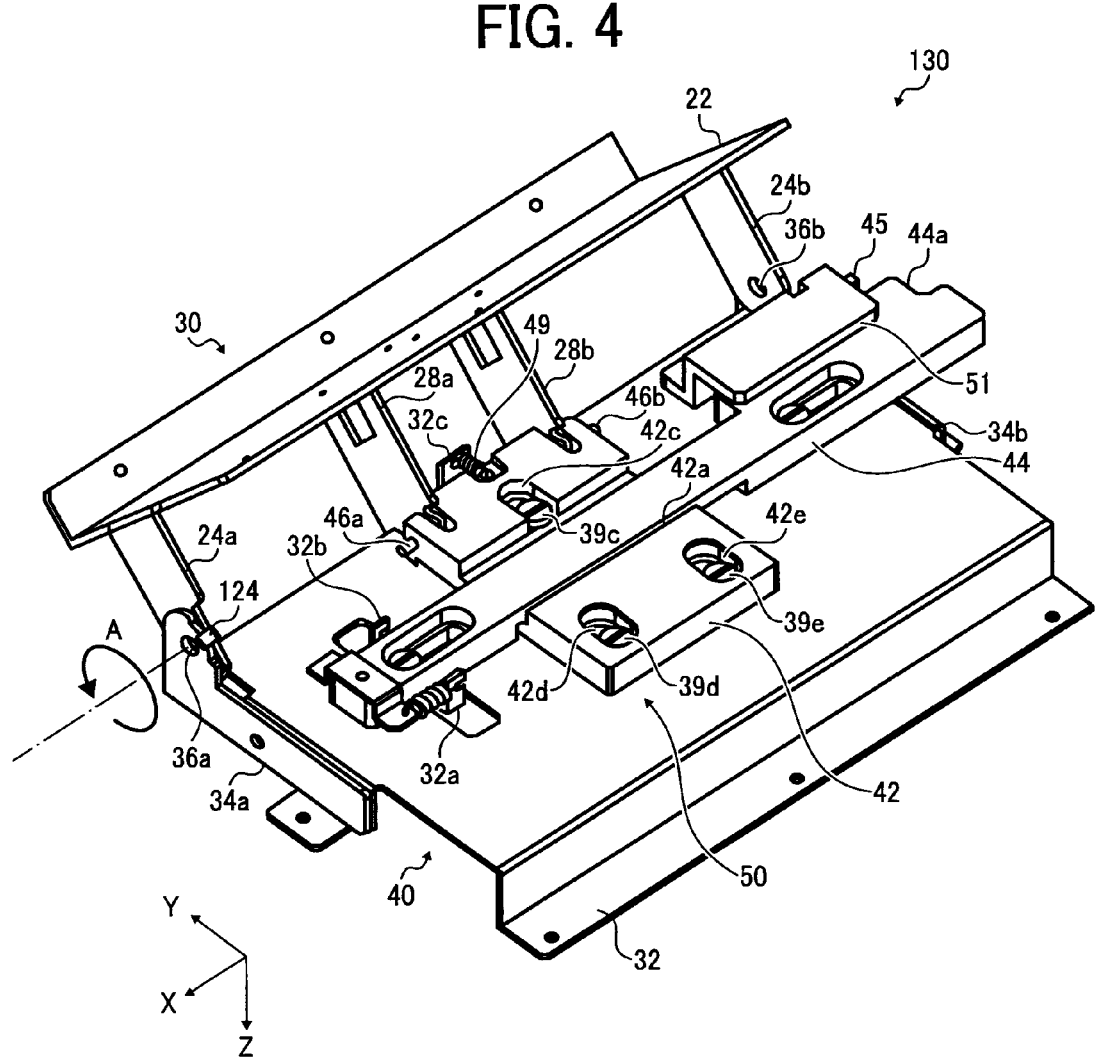
FIG. 4 is a perspective view that enlarges the angle adjustment device of FIG. 3.

FIG. 4 is a perspective view that expands the angle adjustment device 130 in FIG. 3. FIG. 4 illustrates that the angle adjustment device 130 includes a base part 30 having a base plate 22, a rotational portion 40 disposed rotatably up-down about an X axis with respect to the base part 30, and a setting section 50 which blocks/permits up-down rotational movement of the rotational portion 40 with respect to the base part 30.

The base part 30 includes the base plate 22, a pair of rotating arms 24a and 24b disposed at the +X and −X ends of front side of the base plate 22 (+Z side surface in FIG. 4), and angle adjusting arms 28a and 28b disposed at generally central portion with respect to the X axis direction of a front side of the base plate 22. The base plate 22 is composed of a plate-like member which is bent so that a YZ cross-section takes an L-shape and is fixed, by screwing or other means, to a vicinity of the upper end of a front side (−Y side surface) of the main body 110 as shown in FIG. 2A.

Figure 7A:
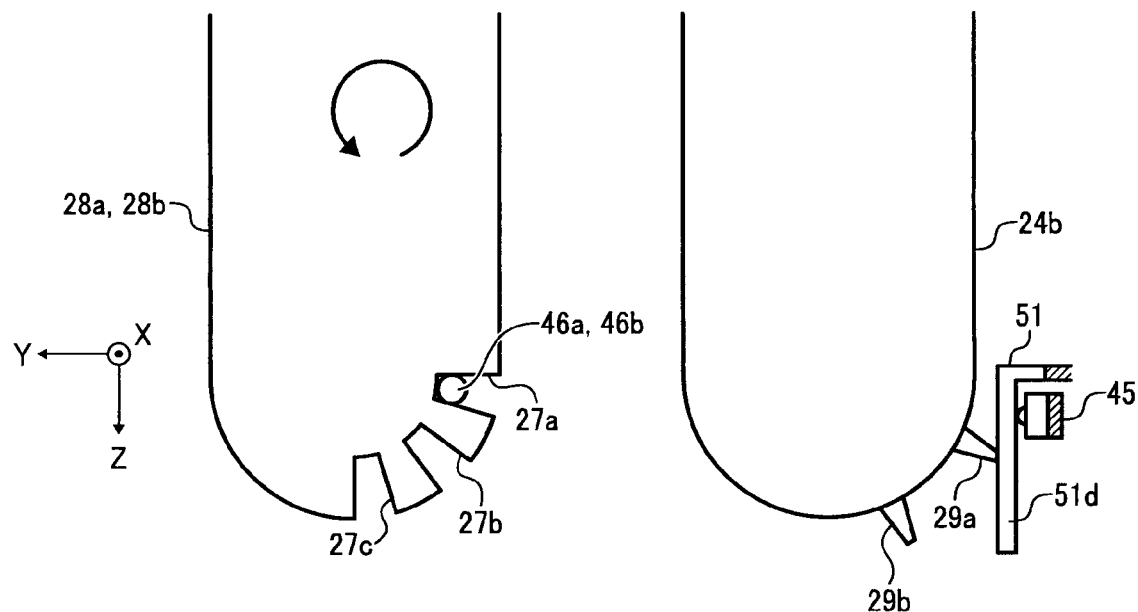
FIG. 7A shows a change of positional relation between angle adjusting arms and lock pins, and operation of a rotating arm in an initial condition where the operation panel is in a condition in FIG. 2A, for the copying machine in accordance with an embodiment of the present invention.
Figure 7B:
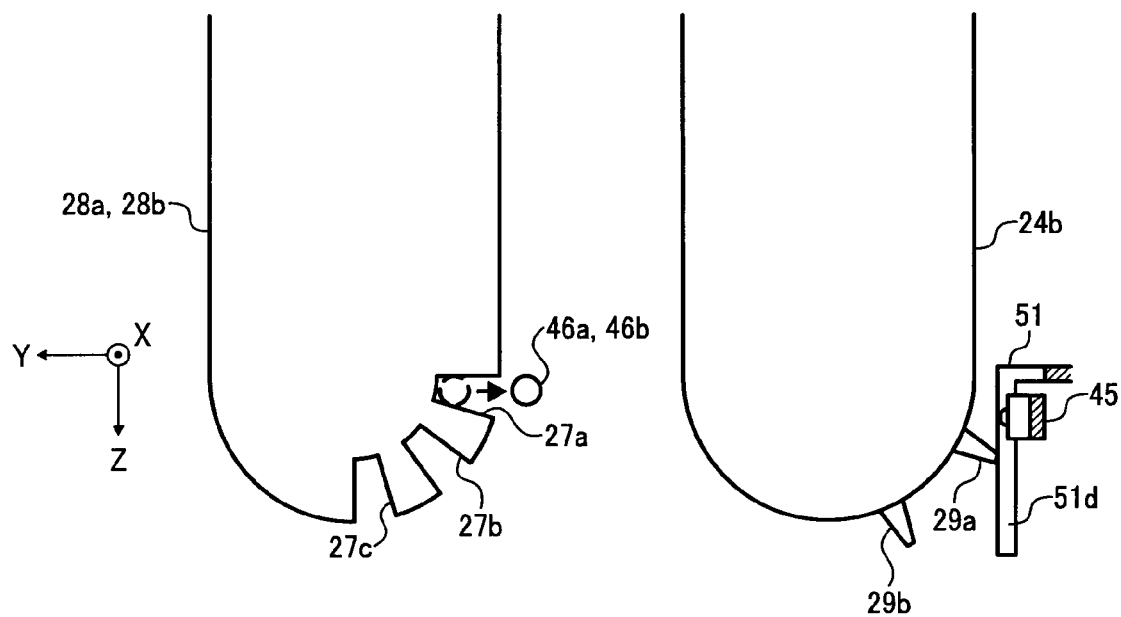
FIG. 7B shows a change of positional relation between angle adjusting arms and lock pins, and operation of a rotating arm in a rotation permitted condition where the operation panel is in a position in FIG. 2A, for the copying machine in accordance with an embodiment of the present invention.

A pair of the rotating arms 24a and 24b is composed of a generally plate-like member, wherein at a vicinity of an end of the rotating arm 24b (+Z side end in FIG. 4), as shown in the right part of FIG. 7A, two projected portions (contacting portion) 29a and 29b are disposed at an predetermined interval. The other rotating arm 24a has as shown in FIG. 4, a restricting member 124 to limit a rotational movement range of the rotating arms 24a and 24b.

A pair of the angle adjusting arms 28a and 28b is composed of generally plate-like members, wherein at an end of the both arms (+Z side end in FIG. 4), as shown in the left part of FIG. 7A, three blocking recessed portions 27a, 27b and 27c are placed at an equal angle interval.

A base part 30 may be, as shown above, composed of separate members, or integrally molded.

Referring back to FIG. 4, the rotational portion 40 includes a rotational portion main unit 32, formed by bending an iron plate and others, and arm holding members 34a and 34b formed of generally L-shaped metal plate fixed on the rotational portion main unit 32 at ends of +X side and −X side. The above-mentioned rotating arms 24a and 24b are supported at the vicinity of each end via rotation axes 36a and 36b to the arm holding members 34a and 34b in such manner that a rotation is freely available. Between the arm holding member 34a and the rotating arm 24a, and between the arm holding member 34b and the rotating arm 24b, a coned disc spring (not shown) is disposed so that an urging force exerted by the coned disc spring along the rotational axis can prevent a rotation between the arm holding member 34a (34b) and the rotating arm 24a (24b) from causing even by a slight force.

The setting section 50 includes a slider 42, mounted on the −Z side surface of the rotational portion main unit 32, which can be moved to the Y axis direction (corresponding to a first axis direction along which lock pins 46a and 46b, as later mentioned blocking members, moves toward and against a rotational axis 36a), and a release lever 44 movable to the X axis direction (corresponding to a second axis which crosses a first axis) while being engaged with the slider 42 (refer to a reverse-printed arrow in FIG. 5).

The slider 42 is, for example, a generally rectangle-like plate-like member made of resin such as plastic (as shown in plain view, as viewed from a −Z direction in FIG. 4. At three locations, which are not aligned in a straight line on the slider 42, guide holes 42c, 42d and 42e are disposed in such way that the longitudinal direction is a Y axis. These guide holes 42c, 42d and 42e are engaged with pins 39c, 39d and 39e which are fixed to an upper surface of the rotational portion main unit 32, wherein the slider 42 is guided on the Y axis direction by means of pins 39c, 39d and 39e and the guide holes 42c, 42d and 42e.

The slider 42 has a concave groove 42a formed in such way that it is located at generally central position of a Y axial direction and extended along the X axial direction. The concave groove 42a has, on a parallel surface with its XY plane, a guide hole 42b as shown in FIG. 6A and others, wherein a longitudinal direction thereof is slanted with respect to X and Y axes.

Figure 6A:
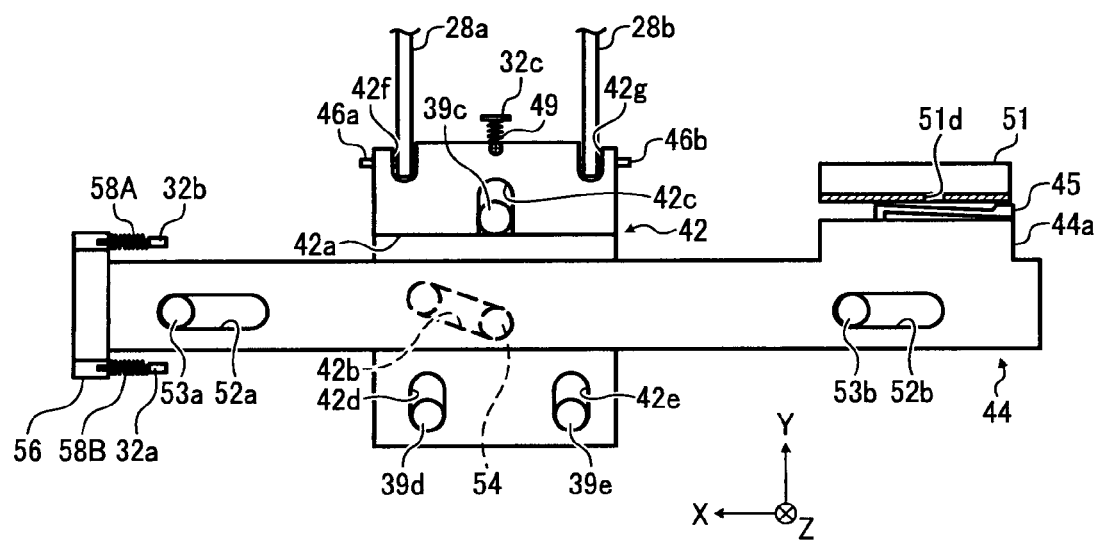
FIG. 6A shows an operation of release lever and slider in a rotation block condition for the copying machine in accordance with an embodiment of the present invention.

In addition, the slider 42, at its end portion of +Y side, has a pair of notches 42f and 42g formed as shown in FIG. 6A, the notches 42f and 42g having lock pins 46a and 46b wherein a longitudinal direction is X axis. These lock pins 46a and 46b have an diameter enough to be engaged with any of blocking recessed portions 27a, 27b and 27c, disposed on the aforementioned angle adjusting arms 28a and 28b (refer to FIGS. 7A to 7C, 8A to 8C, and 9A to 9C).

In addition, the slider 42, at the central portion of X axis direction at the end of +Y side, is connected with an end of a tension spring 49 as a second urging means. The other side of the tension spring 49 is connected to a projected portion 32c which is disposed on a −Z side surface on the rotational portion main unit 32. Thus, the slider 42 has an urging force applied with respect to +Y direction.

Referring back to FIG. 4, the release lever 44 is a generally prismatic member, formed for example of resin such as plastic, wherein its longitudinal direction is the X axis. At a vicinity of a −X side end of the release lever 44, as shown in FIG. 6A, disposed is a convex portion 44a projected toward +Y side. At a vicinity of +X and −X side ends of the release lever 44, formed are guide holes 52a and 52b wherein a longitudinal direction is X axis. These guide holes 52a and 52b are engaged with pins 53a and 53b, both being fixed to a top surface of the rotational portion main unit 32. The release lever 44 are, by means of the pins 53a and 53b and the guide holes 52a and 52b, are guided along a direction parallel to the X axis.

To a +Z side surface at a generally central portion of the release lever 44, fixed is a pin 54 which is projected toward a +Z direction. Because the pin 54 is engaged to a guide hole 42b which is disposed at a vicinity of central portion of the aforementioned slider 42, if the release lever 44 moves toward the X axis direction, the slider 42 moves toward the Y axis direction. In other words, the pin 54 and the guide hole 42b composes a cam mechanism.

To an end of +X side of the release lever 44, fixed is a spring mounting member 56. The spring mounting member 56 connects to an end of tension springs 58A and 58B, the other end of each connecting to hook segments 32a and 32b disposed on a −Z side surface of the rotational portion main unit 32. By means of these tension springs 58A and 58B, a release lever 44 always applies an urging force along the −X direction.

Figure 10A:
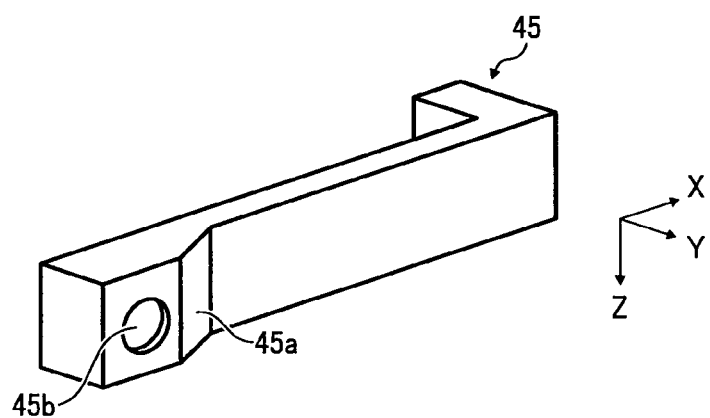
FIG. 10A is a perspective view of a locking member for the copying machine in accordance with an embodiment of the present invention.

In addition, to an end of the +Y side of the convex portion 44a of the release lever 44 disposed is an L-shaped locking member 45 as shown in the plain view (as viewed from −Z side). This locking member 45 composed of for example a resin such as plastic, as shown in exploded view in FIG. 10A, has at an end of the −X side thereof a projected portion 45a, wherein at an end surface of +Y side of the projected portion 45a disposed is a hemispheric convex portion 45b. The locking member 45, by a pressing force exerted from the −Y side, can be deformed elastically as shown in FIG. 6A, thereby being always contact with a fixing member 51 disposed on an −Z side surface of the rotational portion main unit 32.

Figure 10B:
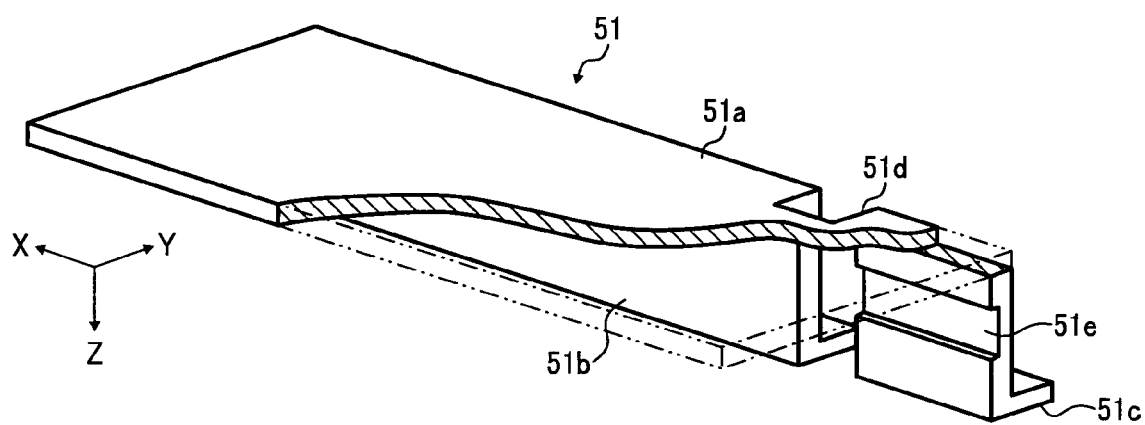
FIG. 10B is a perspective view of the fixing member for the copying machine in accordance with an embodiment of the present invention.

As shown in FIG. 10B with a partial cross-sectional view, the fixing member 51 has a generally Z-shaped YZ cross-section, and includes a first portion 51a having a plane-like shape and a surface in parallel with XY-plane, a second portion 51b connected with an end of +Y side of the first portion 51a, and a third portion 51c connecting with an end of +Z side of the second portion 51b.

Figure 10C:
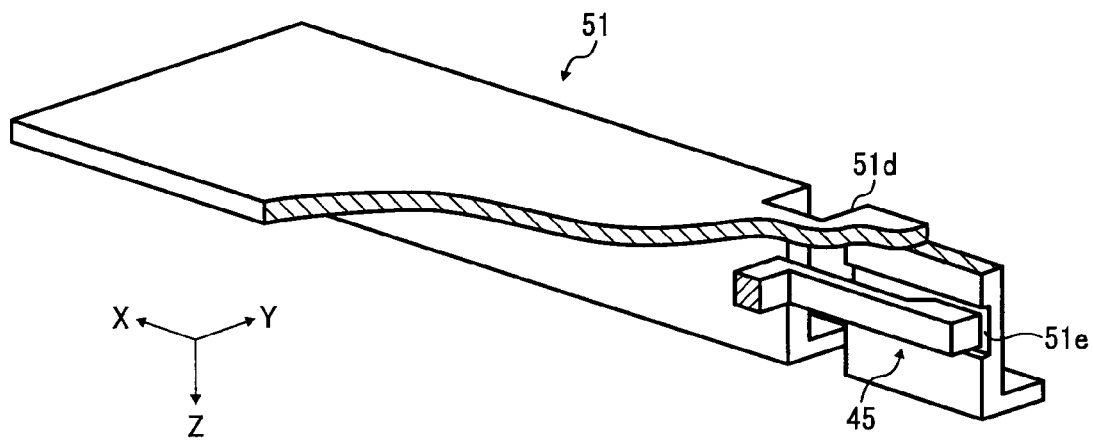
FIG. 10C shows a positional relation between the locking member and the fixing member of the copying machine in accordance with an embodiment of the present invention, where hemispheric convex portion of the locking member is contact with recessed portion of the fixing member.
Figure 10D:
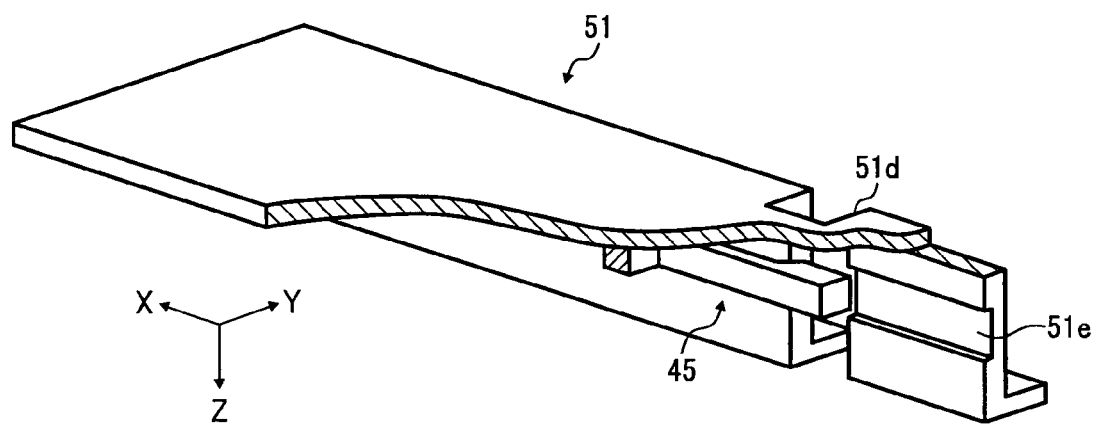
FIG. 10D shows a positional relation between the locking member and the fixing member of the copying machine in accordance with an embodiment of the present invention, where projected portion of the locking member is mated with a notch of the fixing member.

At a vicinity of a −X side end of the fixing member 51 formed is a notch 51d, in which on a part of −Y side surface of the second portion 51b formed is a recessed portion 51e. Thus, the fixing member 51 and the locking member 45 may take a condition, as shown in FIG. 10C, where a hemispheric convex portion 45b of the locking member 45 is in contact with a recessed portion 51e of the fixing member 51, or instead another condition as shown in FIG. 10D, where a projected portion 45a of the locking member 45 is mated with a notch 51d as an engaging portion.

Then, an effect of an angle adjustment device 130 as configured above is described by referring to FIGS. 6A to 6C, 7A to 7C, 8A to 8C, and 9A to 9C and additionally other drawings as necessary. The angle adjustment device 130 is, if mounted on the main body 110, such that the base part 30 is fixed to the main body 110 and the rotational portion 40 rotates with respect to the base part 30. The effect described here is a case where the operation panel 120 rotates anticlockwise from a condition in FIG. 2C to another condition in FIG. 2A. In such a direction of rotation of the operation panel 120, the base part 30 rotates relatively to the rotational portion 40 as shown in an arrow A in FIG. 4.

FIG. 7A shows an angle adjusting arm 28a (28b) (left diagram) in an initial condition (corresponding to a condition in FIG. 2C) and a rotating arm 24b (right diagram). As shown in FIG. 7A, to a blocking recessed portion 27a of an angle adjusting arm 28a (and 28b) is engaged a lock pin 46a(46b).

Thus, in this condition, the angle adjusting arm 28a (28b) and the rotating arm 24a (24b) and a rotation of the rotational portion 40 are also blocked (hereafter, referred to as "rotation block condition").

In this rotation block condition, slider 42 and release lever 44 take a condition as shown in FIG. 6A. In a rotation block condition as shown in FIG. 6A, the release lever 44 reaches an extremity position of −X side within an acceptable range (refer to positional relation between guide holes 52a and 52b and pins 53a and 53b). Accordingly, the slider 42 reaches an extremity position of −Y side within an acceptable range (refer to positional relation between guide holes 42c to 42e and pins 39c to 39e).

In this case, a locking member 45 of the release lever 44 is in contact with a recessed portion 51e of the fixing member 51 (refer to FIG. 10C).

In order to rotate the rotating arm 24a (24b) and the angle adjusting arm 28a (28b) from this rotation block condition, engagement of a lock pin 46a (46b) and an angle adjusting arm 28a (28b) with a blocking recessed portion 27a must be released.

Figure 5:
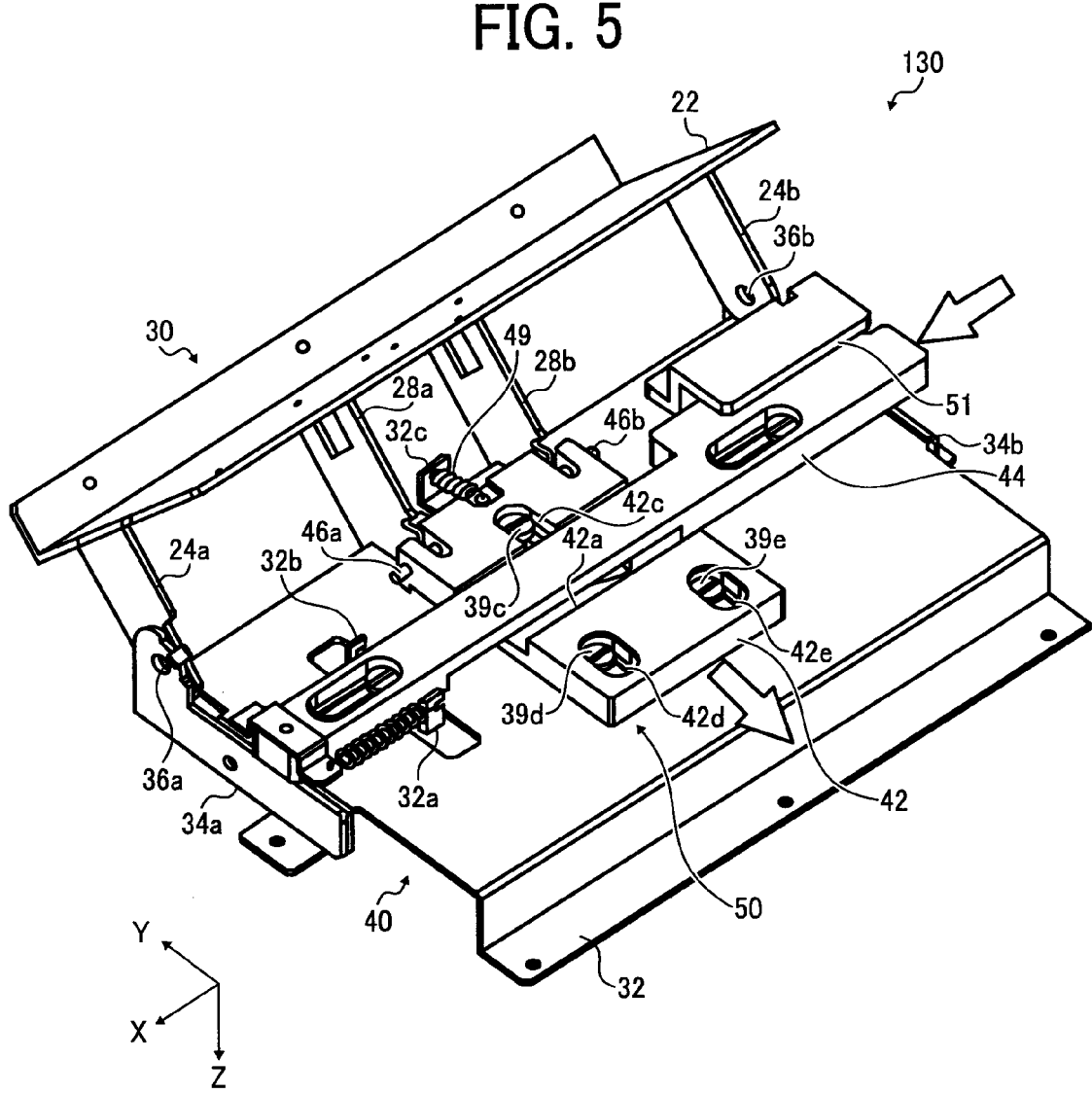
FIG. 5 is a perspective view that enlarges the angle adjustment device, which is in a rotation permitted condition, for the copying machine 100 in accordance with an embodiment of the present invention.
Figure 6B:
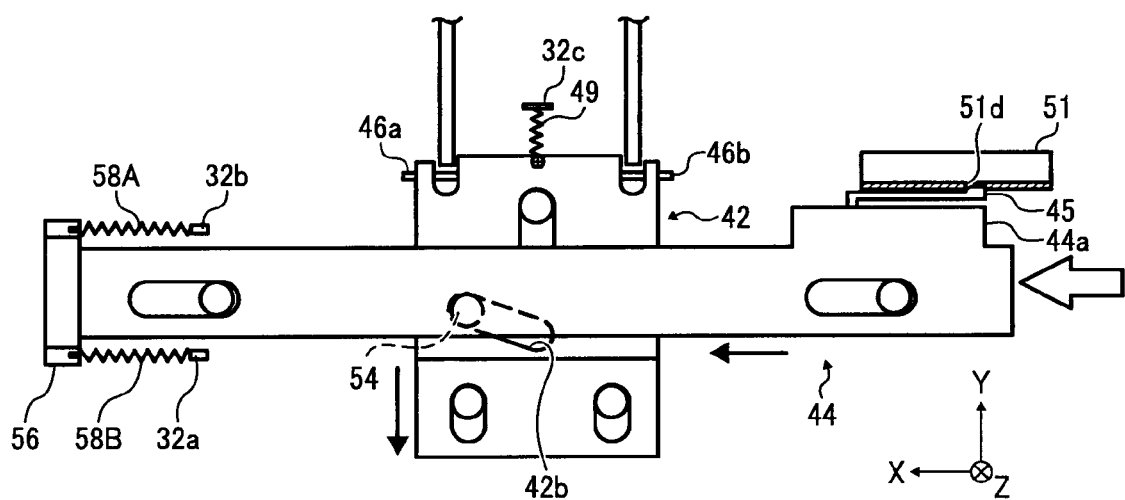
FIG. 6B shows an operation of release lever and slider in a rotation permitted condition for the copying machine in accordance with an embodiment of the present invention.

In this rotation block condition, as shown in FIG. 5 and FIG. 6B, if a user presses the release lever 44 toward +X direction (actually, pressing a depressing button 20 as shown in FIG. 2A and other diagrams), then the release lever 44 moves toward +X direction, thereby the slider moves toward −Y direction by a cam mechanism of the guide hole 42b and the pin 54. Thus, when the slider 42 moves toward −Y direction, as shown in a right diagram in FIG. 7B, the lock pins 46a and 46b are removed from the blocking recessed portion 27a of the angle adjusting arm 28a(28b) (this condition is hereafter referred to as "rotation permitted condition"). In this condition, as shown in FIG. 6B, the projected portion 45a of the locking member 45 of the release lever 44 is mated with a notch 51d of the fixing member 51 (refer to FIG. 10D) and the release lever 44 movement toward the X axis direction is blocked (lock condition), thus positions of the release lever 44 and the slider 42 are kept in a condition as shown in FIG. 6B.

Figure 7C:
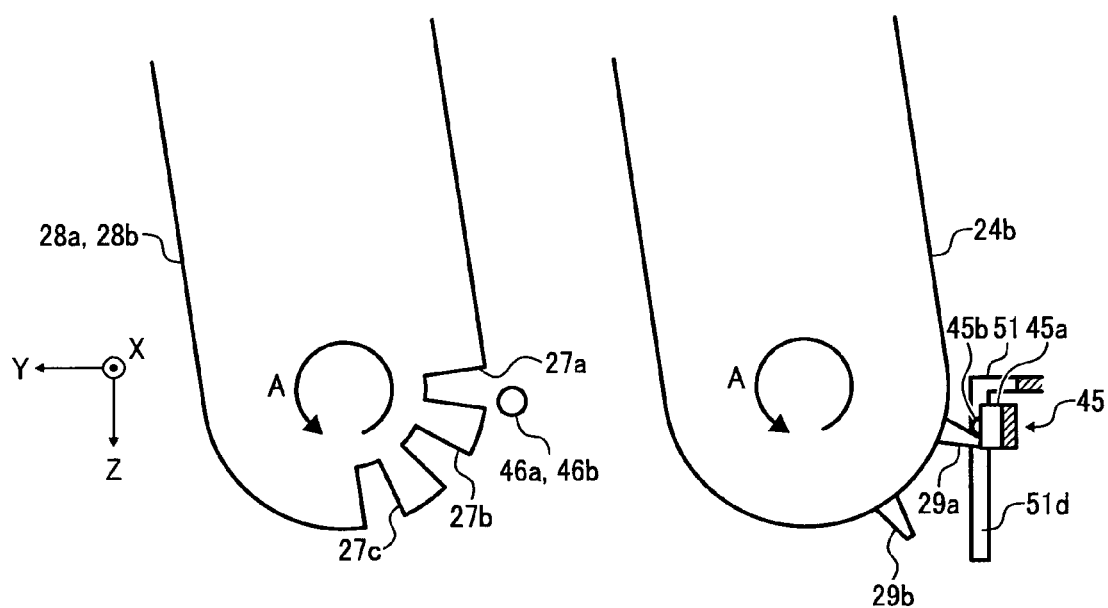
FIG. 7C shows a change of positional relation between angle adjusting arms and lock pins, and operation of a rotating arm for the copying machine in accordance with an embodiment of the present invention, in a process where a rotation permitted condition changes to a free condition when the operation panel rotates from a position in FIG. 2A to another position in FIG. 2B.

In a rotation permitted condition, as described above, a rotational portion 40 can rotate with respect to the rotating arm 24a (24b) and the angle adjusting arm 28a(28b), by relative rotation of the rotational portion 40 and the base part 30, as shown in a right diagram of FIG. 7C, thus a projected portion 29a of the rotating arm 24b is contact with a hemispheric convex portion 45b of the locking member 45. Then, as shown in a right diagram of FIG. 8A, by a further relative rotation of the rotational portion 40 and the base part 30, projected portion 29a accordingly pushes up the locking member 45, and a further rotation of rotational portion 40 from a condition as shown in a right diagram of FIG. 8A will remove a projected portion 45a of the locking member 45 from a notch 51d of the fixing member 51 as shown in a right diagram of FIG. 8B. Where, because the release lever 44 is, as described above, always urged toward −X direction by tension springs 58A and 58B, it immediately moves toward −X direction after from the notch 51d the locking member 45 is removed. Movement of the release lever 44 toward −X direction will cause the slider 42 to move toward +Y direction.

Figure 6C:
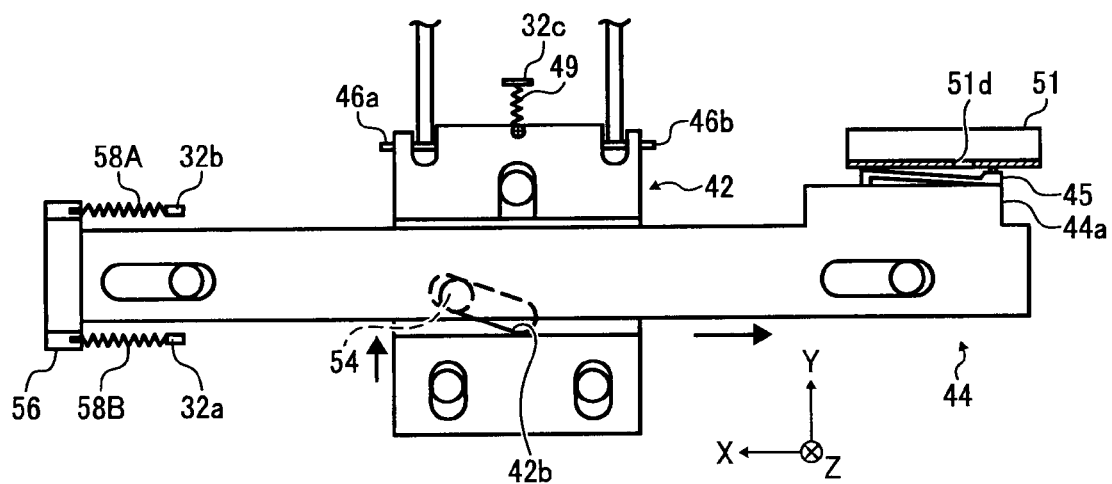
FIG. 6C shows an operation of release lever and slider in a free condition for the copying machine in accordance with an embodiment of the present invention.
Figure 8A:
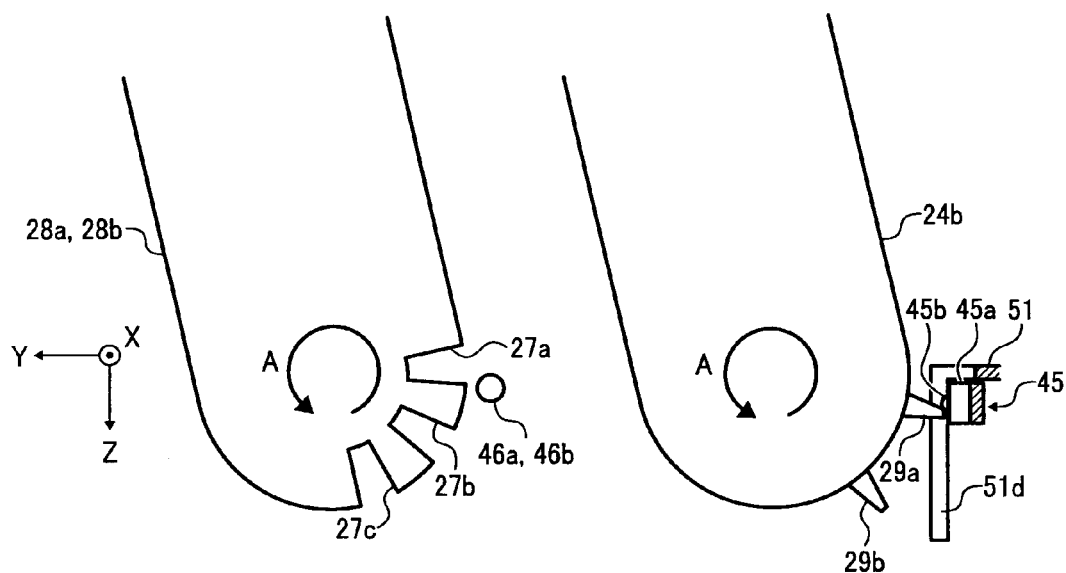
FIG. 8A shows a change of positional relation between angle adjusting arms and lock pins, and operation of a rotating arm for the copying machine in accordance with an embodiment of the present invention in a process where a rotation permitted condition changes to a free condition when the operation panel rotates from a position in FIG. 2A to another position in FIG. 2B.
Figure 8B:
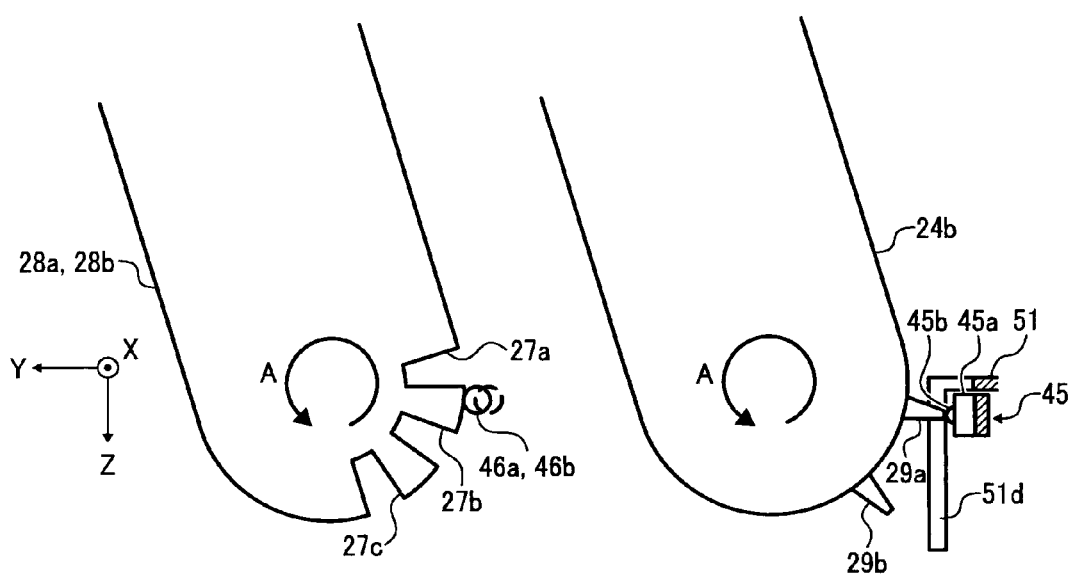
FIG. 8B shows a change of positional relation between angle adjusting arms and lock pins, and operation of a rotating arm for the copying machine in accordance with an embodiment of the present invention, indicating a free condition when the operation panel changes a position in FIG. 2A to that in FIG. 2B.

Here, as shown in a right diagram of FIG. 8B, lock pins 46a and 46b are in contact with a convex portion between a blocking recessed portions 27a and 27b of the angle adjusting arms 28a and 28b, thus the slider 42 stops in a condition shown in FIG. 6C, not restoring a condition as shown in FIG. 6A. In this case, blocking recessed portions 27a to 27c and lock pins 46a and 46b of the angle adjusting arm 28a and 28b are not in contact with each other, thereby the rotational portion 40, the angle adjusting arms 28a and 28b and the rotating arms 24a and 24b are in such condition that they can relatively rotate. This condition is hereafter referred to as "free condition".

Figure 8C:
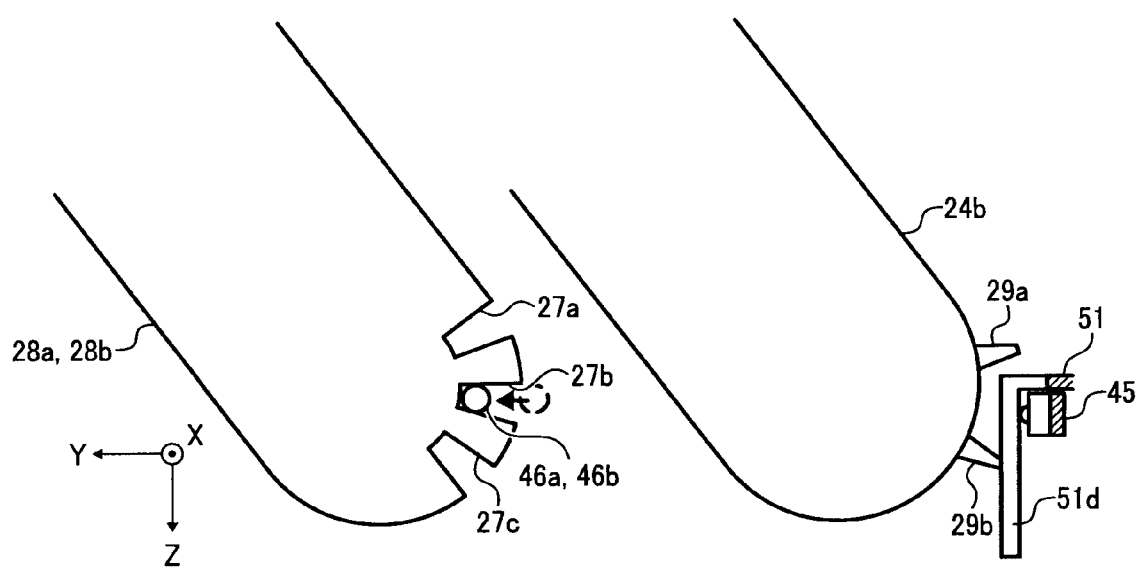
FIG. 8C shows a change of positional relation between angle adjusting arms and lock pins, and operation of a rotating arm for the copying machine in accordance with an embodiment of the present invention, indicating a rotation block condition when the operation panel is positioned as specified in FIG. 2B.

If the rotational portion 40 further moves relatively with angle adjusting arms 28a and 28b and rotating arms 24a and 24b from the free condition, then the Z axial positions of the blocking recessed portion 27b and the lock pins 46a and 46b of the angle adjusting arms 28a and 28b are matched with each other, thus as shown in a left diagram of FIG. 8C, the lock pins 46a and 46b are engaged with the blocking recessed portion 27b of the angle adjusting arms 28a and 28b. In other words, a rotation block condition may be resumed.

By taking an operation as mentioned above, an angle between the base part 30 and the rotational portion 40 may be incremented by one step (one step of the blocking recessed portion 27a to 27c).

Hereafter, in order to adjust an angle by one step (one step out of blocking recessed portions 27a to 27c), likely with the above procedure as shown in FIG. 6B, the rotation block condition is set again (see FIG. 9C) by; pressing the release lever 44 to move the lock pins 46a and 46b toward −Y direction for setting the rotation permitted condition (see FIG. 9A), moving relatively the rotational portion 40 and the base part 30 (angle adjusting arms 28a and 28b and rotating arms 24a and 24b) to disengage between the locking member 45 and notch 51d of the fixing member 51 thereby entering the free condition (see FIG. 9B), and further moving relatively the rotational portion 40 and the base part 30 (angle adjusting arms 28a and 28b and rotating arms 24a and 24b) to engage the lock pins 46a and 46b with blocking recessed portion 27c of the angle adjusting arms 28a and 28b.

Taking the above operation causes an angle between the base part 30 and rotational portion 40 (one step of blocking recessed portions 27a to 27c) to change by one step.

The above description clarifies a case where the operation panel 120 is rotated, as shown in FIG. 2, anticlockwise, in other words, as shown in FIG. 4, the base part 30 is rotated toward the arrow A with respect to the rotational portion 40 for adjusting an angle. Reverse rotation against the arrow A, in other words, as shown in FIG. 2, rotating clockwise the operation panel 120 for adjusting an angle also may take a same operation.

Figure 9A:
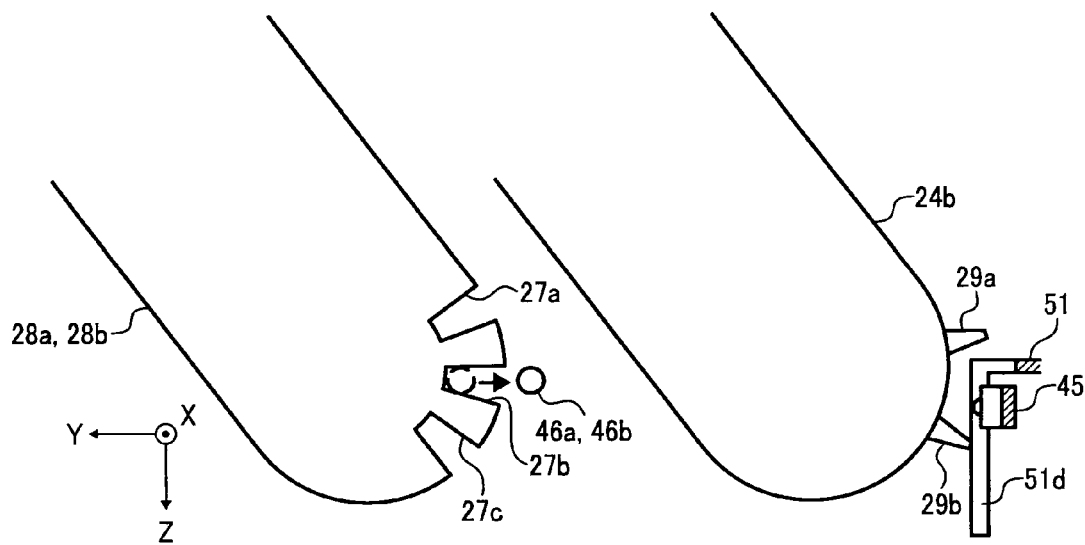
FIG. 9A shows a change of positional relation between angle adjusting arms and lock pins, and operation of a rotating arm for the copying machine in accordance with an embodiment of the present invention, indicating a rotation permitted condition where the operation panel is positioned as specified in FIG. 2B.
Figure 9B:
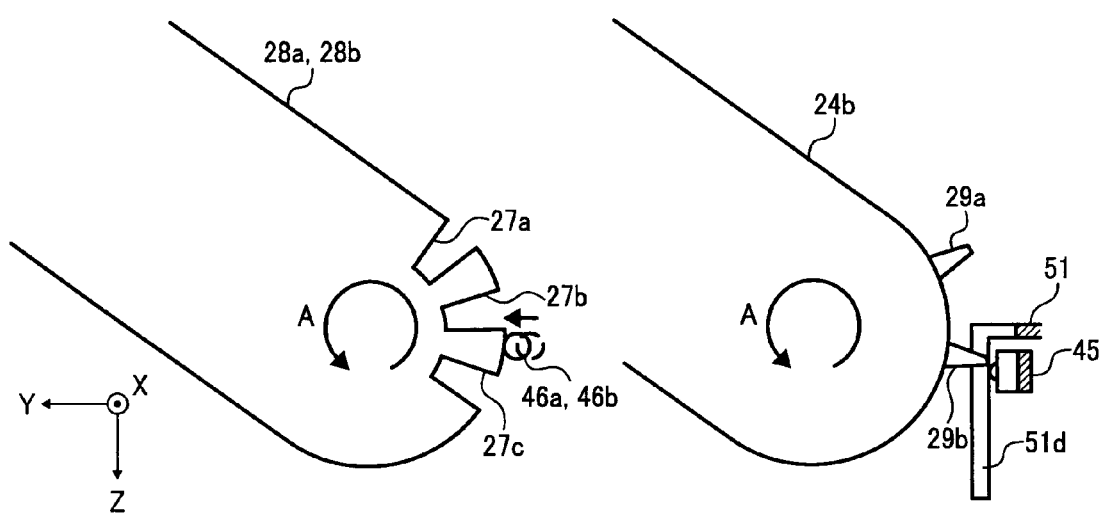
FIG. 9B shows a change of positional relation between angle adjusting arms and lock pins and, and operation of a rotating arm for the copying machine in accordance with an embodiment of the present invention, indicating a free condition when the operation panel changes a position in FIG. 2B to that in FIG. 2C.
Figure 9C:
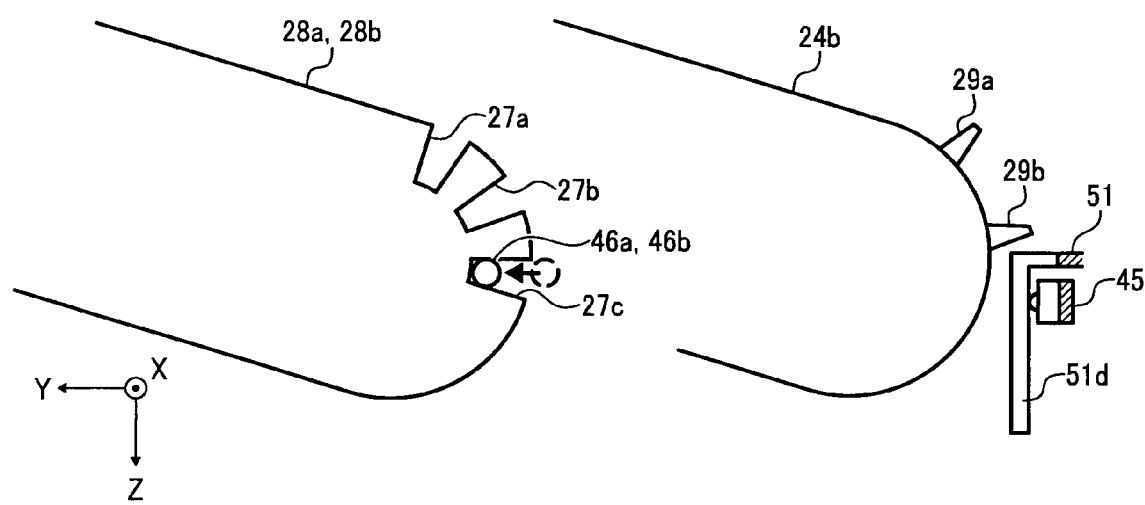
FIG. 9C shows a change of positional relation between angle adjusting arms and lock pins, and operation of a rotating arm for the copying machine in accordance with an embodiment of the present invention, indicating a rotation block condition when the operation panel is positioned as specified in FIG. 2C.

Above description refers to a case of a rotation in a same direction, though as shown in FIG. 8B and FIG. 9B, a free condition exists when an angle adjustment is performed. Thus, for example, from a condition as shown in FIG. 8B, a reverse rotation against the arrow A direction may be taken to restore a condition as shown in FIG. 8A.

In this embodiment, the operation panel 120 is fixed to the main body 110 via the angle adjustment device 130 enabling an angle adjustment as mentioned above, thereby a stepwise angle adjustment is available between FIGS. 2A and 2B and between FIGS. 2B and 2C.

As described above, according to the angle adjustment device 130 in this embodiment, pressing and sliding the release lever 44 alone will release a rotation block condition exerted by lock pins 46a and 46b and blocking recessed portions 27a to 27c (into the rotation permitted condition), and additionally maintain a rotation permitted condition. Then, in the rotation permitted condition, rotating the operation panel 120 will interlockingly change the lock pins 46a and 46b and the blocking recessed portions 27a to 27c into a free condition. Rotating further the operation panel 120 will restore a rotation block condition where the lock pins 46a and 46b and the blocking recessed portions 27a to 27c are engaged.

Thus, when a user adjusts an angle of the operation panel 120, by pressing the release lever 44 and adjusting an angle of the operation panel 120, both of which are a simplified operation even available by one hand, an angle of the operation panel 120 can be adjusted.

According to this embodiment, as described above, via the angle adjustment device 130 for adjusting an angle of the operation panel 120 with a simplified operation, an operation panel 120 is mounted on the main body 110. Thus when entering a command to the operation panel 120, a user can adjust an angle of the operation panel 120 suitably for the user with a simplified operation so that the operability and visibility of the operation panel 120 on the copying machine 100 can be maintained with a simplified operation.

Figure 11A:
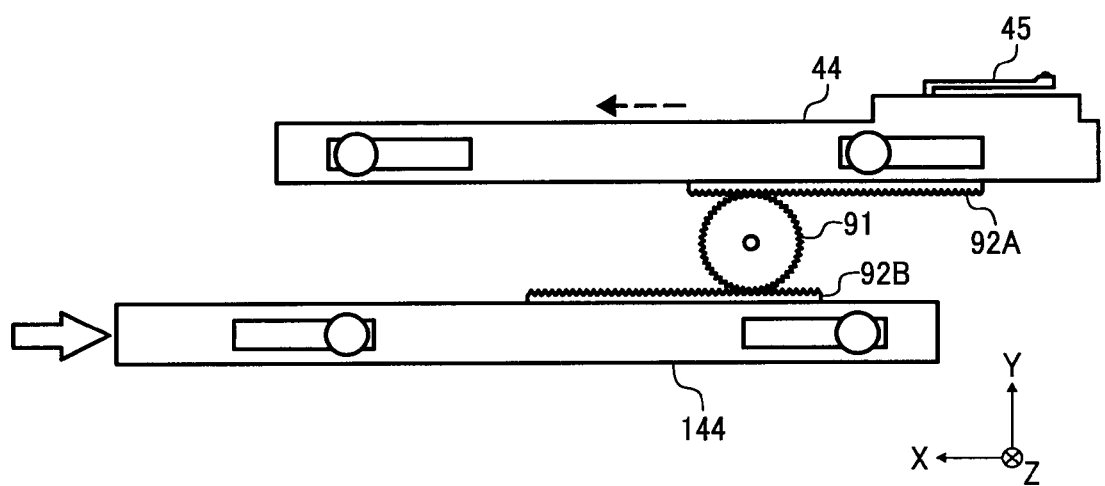
FIG. 11A shows a variation of the copying machine in accordance with an embodiment of the present invention, where a right hand release lever interlocking with a release lever is added.

The above embodiment employs a configuration wherein to the −X side of the operation panel 120 (i.e. left hand side of user) is disposed the depressing button 20. Not limited to this configuration, such configuration may also be employed that to the +X side (i.e. right hand side of user) is disposed the depressing button 20. Or, it is also accepted that to both +X side and −X sides of the operation panel 120 are disposed the depressing buttons 20. Various types of mechanism are assumed in this case; for example, that in FIG. 11A is available. A configuration in FIG. 11A includes a right hand side release lever 144 in addition to the release lever 44 as shown in FIG. 6A, wherein to the −Y side surface of the release lever 44 is disposed a rack 92A and to the +Y side surface of the right hand side release lever 144 is disposed a rack 92B. The racks 92A and 92B is each engaged with a gear 91.

With such structure employed, pressing the right hand side release lever 144 toward −X direction, by a power transmission effect consequently exerted between gears 91 and racks 92A and 92B, will move the release lever 44 toward +X direction. That is, pressing either the right hand side release lever 144 or the release lever 44 has a same effect with the above mentioned embodiment.

Without being limited to an above mentioned mechanism having a gear and a rack, a same effect is obtained even by employing a link mechanism between the right hand side release lever 144 and the release lever 44.

The above mentioned embodiment adopts a mechanism of pressing the release lever 44 from a side of the operation panel 120. Not limited to this embodiment, for example, another mechanism may be adopted wherein a depressing button for pressing the release lever 44 is placed on the front side (−Y side) of the operation panel 120. For this purpose, various mechanisms are available; for example, including that shown in FIG. 11B, which, in addition to the release lever 44 as shown in diagrams such as FIG. 6A, has a front side release lever 244, wherein a rack 192A is disposed on a −Y side surface of the release lever 44 and a rack 192B is disposed on a +X side surface of the front side release lever 244. The rack 192A is also engaged with a gear 191a out of a two-step gear 191 while the rack 192B is engaged with a gear 191b out of a two-step gear 191.

With such structure adopted, pressing the front side release lever 244 toward the +Y direction, by a resulting effect of power transmission exerted between the two-step gear 191 and the racks 192A and 192B, will move the release lever 44 toward the +X direction. Thus, pressing either the front side release lever 244 or the release lever 44 can achieve a same effect with that of the above embodiment.

Figure 11B:
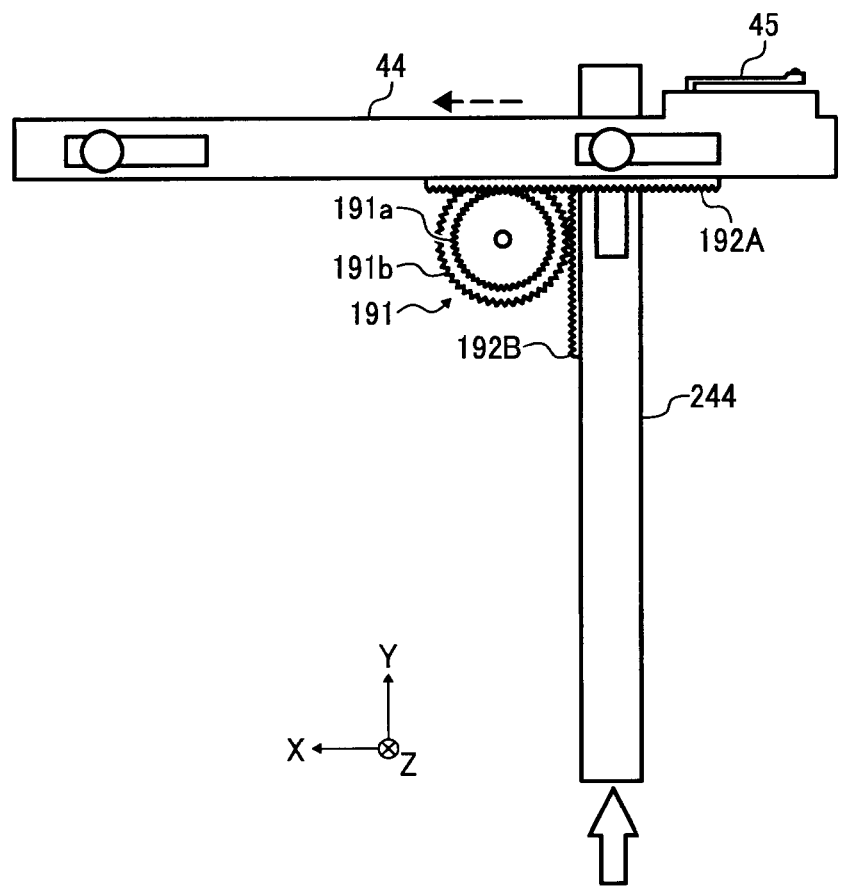
FIG. 11B shows another variation of the copying machine in accordance with an embodiment of the present invention, where a front side release lever interlocking with the release lever is added.

With a structure in FIG. 11B, either structure is allowed for user, to access both the front side release lever 244 and release lever 44, or to access for example only the front side release lever 244.

Still, not limited to a case of adopting a mechanism having a gear and rack as above described, a same effect as described above can be achieved by other mechanism for example by placing a link mechanism between the front side release lever 244 and the release lever 44.

The above embodiment states that the release lever 44 has only one locking member 45. Not limited to this, though, for example, an alternative structure is also available as shown in FIG. 12A where two locking members 245a and 245b are disposed.

In this example, with respect to the locking members 245a and 245b, two notches 151a and 151b are disposed onto the fixing member 151, and additionally, with respect to the notches 151a and 151b disposed are two rotating arms 124a and 124b having a same structure with the rotating arm 24b.

Figure 12A:
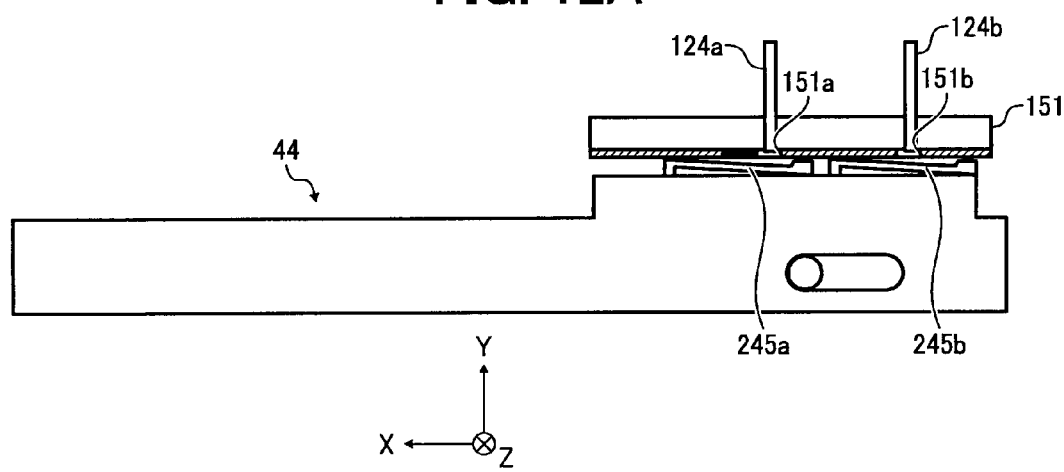
FIG. 12A shows a variation of the copying machine in accordance with an embodiment of the present invention, where two locking members are disposed, both not being engaged with notches.
Figure 12B:
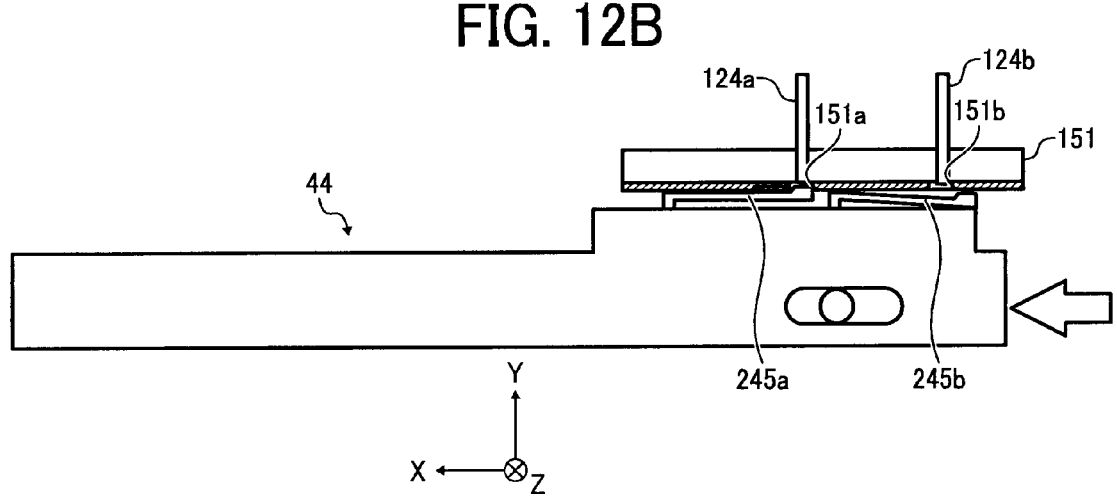
FIG. 12B shows a variation of the copying machine in accordance with an embodiment of the present invention, where two locking members, the locking member being engaged with the notch.
Figure 12C:
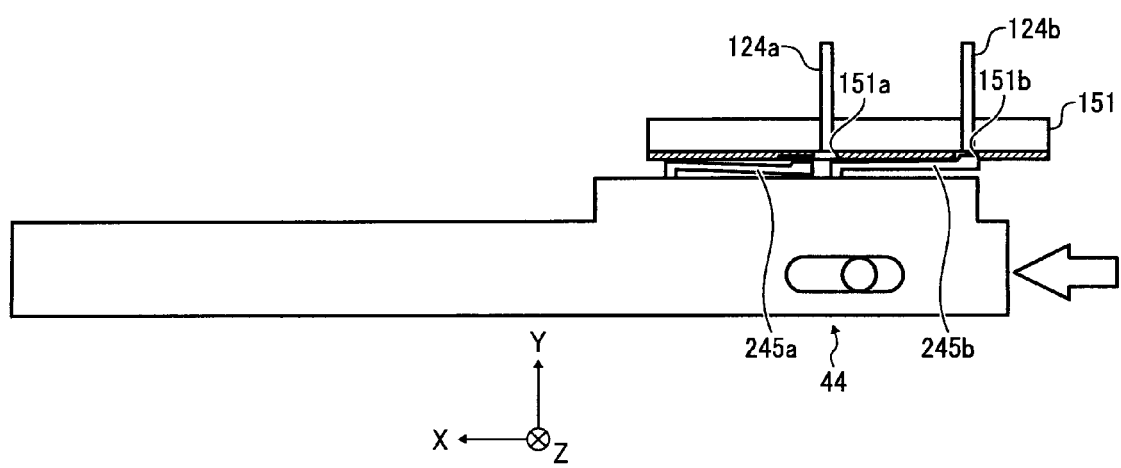
FIG. 12C shows a variation of the copying machine in accordance with an embodiment of the present invention, where two locking members are disposed, the locking member being engaged with notch.

With such structure adopted, a transition is available in any of three cases; a case as shown in FIG. 12A, wherein neither of two locking members 245a and 245b is engaged with the notches 151a and 151b of the fixing member 151, a case as shown in FIG. 12B, wherein one locking member 245a only is engaged with the notch 151a, and a case as shown in FIG. 12C, wherein another locking member 245b only is engaged with the notch 151b.

Among the three cases, only the case in FIG. 12A is in a rotation block condition (where as shown in FIG. 6A, the lock pins 46a and 46b are engaged with the blocking recessed portions 27a to 27c of the angle adjusting arms 28a and 28b). Instead, cases of FIG. 12B and FIG. 12C are in a rotation permitted condition (where as shown in FIG. 6B, the lock pins 46a and 46b are not engaged with the blocking recessed portions 27a to 27c of the angle adjusting arms 28a and 28b).

Thus, for example, a user who attempts to adjust an angle of the operation panel 120 by one step (i.e. one step for the blocking recessed portions 27a to 27c disposed onto the angle adjusting arms 28a and 28b) may just press the release lever 44 toward +X direction until from a condition in FIG. 12A (rotation block condition), the locking member 245a is engaged with the notch 151a (transition to the rotation permitted condition) as shown in FIG. 12B. In this condition, rotating the operation panel 120 will, by the rotating arm 124a, release an engagement between the locking member 245a and the notch 151a, thereby a state as shown in FIG. 12A being restored. Thus, a user can adjust an angle of the operation panel 120 by one step only and then restore back to the rotation block condition again.

On the other hand, a user who attempts to adjust an angle by two consecutive steps onto the operation panel 120 (two steps of the blocking recessed portions 27a to 27c disposed on the angle adjusting arms 28a and 28b) may press the release lever 44 toward +X direction until from a condition in FIG. 12A (rotation block condition), the locking member 245b is engaged with the notch 151b as shown in FIG. 12C (transition to the rotation permitted condition). In this condition, if the operation panel 120 rotates by one step, then the rotating arm 124b will disengage between the locking member 245b and the notch 151b, thereby transitioning back to a condition in FIG. 12B. In this case, because the rotation permitted condition still remains, by rotating the operation panel 120 one step further, the rotating arm 124a will disengage between the locking member 245a and the notch 151a, thereby again transitioning back to a condition as shown in FIG. 12A.

Thus, after adjusting an angle of the operation panel 120 by two consecutive steps, a use can again restore back to the rotation block condition.

FIGS. 12A, 12B and 12C describe a case where the fixing member 151 has two notches 151a and 151b as an engaging portion. Not limited to this case, only one engaging portion is naturally allowed.

The above embodiment describe a case where a setting section 50 equipped with lock pins 46a and 46b constituting a block mechanism is disposed on the rotational portion 40, and blocking recessed portions 27a to 27c engaged with lock pins 46a and 46b are disposed on the base part 30. Apart from this, the setting section 50 may be disposed on the base part 30 and a blocking recessed portion engaged with the lock pins may be disposed on the rotational portion 40.

The above described embodiment uses, as a blocking member, cylindrical lock pins 46a and 46b. Not limited to this, a block member of any other shape than a cylinder is allowed to adopt as far as it is engageable with a blocking recessed portion, such as a bar-like member having a cross-section of polygon or otherwise, a hook-shaped or nail-shaped blocking member.

The above embodiment describes a case where the lock pins 46a and 46b as a blocking member moves toward Y axis direction. Without being limited to this, a structure adopted is allowed in which a blocking member moves toward X axial direction. In this case, a blocking recessed portion of the angle adjusting arms 28a and 28b may take any shape, not limited to the blocking recessed portions 27a to 27c, of circular opening. The above embodiment describes a case where angle adjusting arms 28a and 28b and rotating arms 24a and 24b are separately disposed. Without being limited to this, a part of rotating arm may have a same function as that of angle adjusting arm. One angle adjusting arm, not limited to two, is also allowed.

The above described embodiment realizes a free condition by means of a predetermined interval between blocking recessed portions 27a to 27c of the angle adjusting arms 28a and 28b. Instead of this structure, however, an alternative way is available in which a tiny space is disposed between the blocking recessed portions 27a to 27c, avoiding any free condition.

According to the above embodiment, angle adjusting arms 28a and 28b have three blocking recessed portions 27a to 27c, disposed with an equal angle interval. Without being limited to this, however, any number of blocking recessed portions and any amount of interval can be set. That is, for example, if it is known that the use is limited to conditions as shown in FIGS. 2A and 2C, then blocking recessed portions 27a and 27c only may be disposed to the angle adjusting arms 28a and 28b. Instead, if any other angle is desired by user, then according to such angle, an appropriate blocking recessed portion may be disposed. Here, however, depending on a position of the blocking recessed portion, it is required to adjust a position of a projected portion of the rotating arm 24b.

According to the above embodiment, both the slider 42 and the release lever 44 connect with the tension springs 49, 58A and 58B. However, instead of this structure, at least either, not both, may be equipped with a tension spring.

The above embodiment employs as a recovery mechanism the tension springs 49, 58A and 58B. Not limited to this structure, it is acceptable to use other elastic matter such as spring and plate spring, a fluid pressure damper and an electric or fluid pressure actuator. What matters is a recovery mechanism which is able to change a rotation block release condition of the operation panel by means of a block mechanism to a rotation block condition thereof.

The above embodiment employs the depressing button 20 for pressing the release lever 44. Instead, it may employ a handle to move the release lever 44 toward +X direction.

The above described embodiment employs as a fixing mechanism the locking member 45 and the fixing member 51. Without being limited to this structure, the present invention may adopt various mechanisms to hold a position of the release lever 44 (or slider 42) in order to keep a rotation permitted condition.

The above embodiment and variation are only an example and the present invention is not limited to such structures as mentioned above.

The above embodiment explains a case where this an angle adjustment device according to the present invention applies to the copying machine 100. Without being limited to this case, an angle adjustment device according to the present invention may be applicable not only to a device having a main body and an operation panel, such as for example an image forming apparatus (e.g. printer, facsimile machine, integrated copying and facsimile machine, and the integrated machine further with printer function) other than the copying machine 100, but also any device other than an image forming apparatus.

INDUSTRIAL APPLICABILITY

As described above, an angle adjustment device according to the present invention is suitable for adjusting an angle of operation panel on the main body. In addition an image forming apparatus according to the present invention is also suitable for creating an image based on a command a user enters.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An angle adjustment device, comprising;
    a main body;
    an operation panel movably supported on the main body;
    a block mechanism to block movement of the operation panel with respect to the main body;
    a release-hold mechanism to release movement of the operation panel by the block mechanism and hold a released state of the operation panel; and
    a recovery mechanism to return to a state in which movement of the operational panel is blocked by the block mechanism from a state in which the movement of the operation panel is released by the block mechanism.

2. The angle adjustment device according to claim 1, wherein the block mechanism includes an arm provided on a first member which is either the main body or the operation panel, the arm having a plurality of blocking recessed portions formed with an interval of predefined angle about a central rotational axis with respect to the main body of the operation panel, and a blocking member disposed to a second member different from the first member which is either the main body or the operation panel, the blocking member being engaged with any of a plurality of the blocking recessed portions so to block rotation of the operation panel with respect to the main body.

3. The angle adjustment device according to claim 2, wherein the release-hold mechanism maintains a released blocking by means of the block mechanism while the operation panel being rotated by the predefined angle, and if the operation panel rotation exceeds the predefined angle, releases a hold to restore back to the block condition by means of the recovery mechanism.

4. The angle adjustment device according to claim 2, wherein the blocking member is a bar-like member engaged with the blocking recessed portion.

5. The angle adjustment device according to claim 2, wherein the release-hold mechanism includes a slider having the blocking member and moving along a first axis direction in which the blocking member comes close to and off the rotation axis, and a fixing mechanism for fixing the slider at a position where the blocking member comes off the blocking recessed portion due to movement along the first axis direction of the slider.

6. The angle adjustment device according to claim 5, wherein the release hold mechanism further includes a release lever movable to a second axis direction intersecting with the first axis, and a cam mechanism for moving the slider to the first axis direction along a movement of the release lever toward the second axis direction.

7. The angle adjustment device according to claim 6, wherein the fixing mechanism includes a locking member disposed onto a part of the release lever, and a fixing member having an engaging portion with which the locking member engages with along movement of the release lever from one side of the second axis direction to the other side.

8. The angle adjustment device according to claim 7, wherein a plurality of the locking members are disposed to the second axis direction with a predefined interval therebetween.

9. The angle adjustment device according to claim 8, wherein the fixing member has a plurality of the engaging portions disposed to correspond to a plurality of the locking members.

10. The angle adjustment device according to claim 6, wherein; the release lever, by receiving a pressing force from externally, moves from one side of the second axis direction to the other side, and the slider, along movement of the release lever from one side of the second axis direction to the other side, moves blocking member away from the blocking recessed portion.

11. The angle adjustment device according to claim 7, wherein the release hold mechanism contacts the locking member along rotation of the operation panel with respect to the main body and has a contacting portion to release an engagement of the locking member with an engagement portion of the fixing member.

12. The angle adjustment device according to claim 7, wherein the recovery mechanism has an urging means to always urge the release lever from the other side of the second axis direction to one side.

13. The angle adjustment device according to claim 7, wherein the recovery mechanism further comprises an urging means to always urge the slider toward a such direction that the blocking member moves close to the rotation axis.

14. An image forming apparatus, comprising;
an operation panel on which a user enters a command, a main body forming an image based on a command entered from the operation panel, and the angle adjustment device according to claim 1, adjusting an up-down rotation angle of the operation panel with respect to the main body.

* * * * *